United States Patent
Lauer et al.

(10) Patent No.: US 12,194,567 B2
(45) Date of Patent: Jan. 14, 2025

(54) APPARATUS AND METHOD FOR STRUCTURING A ROLLER SURFACE

(71) Applicants: ThyssenKrupp Steel Europe AG, Duisburg (DE); thyssenkrupp AG, Essen (DE)

(72) Inventors: Benjamin Lauer, Nonnweiler (DE); Stefan Wischmann, Berlin (DE); Martin Koch, Neukirchen-Vluyn (DE); Karl-Heinz Kopplin, Essen (DE); Folkert Schulze-Kraasch, Duisburg (DE); Oliver Vogt, Dortmund (DE)

(73) Assignees: ThyssenKrupp Steel Europe AG, Duisburg (DE); thyssenkrupp AG, Essen (DE)

( * ) Notice: Subject to any disclaimer, the term of this patent is extended or adjusted under 35 U.S.C. 154(b) by 873 days.

(21) Appl. No.: 17/292,167

(22) PCT Filed: Oct. 29, 2019

(86) PCT No.: PCT/EP2019/079458
§ 371 (c)(1),
(2) Date: May 7, 2021

(87) PCT Pub. No.: WO2020/094450
PCT Pub. Date: May 14, 2020

(65) Prior Publication Data
US 2021/0394309 A1 Dec. 23, 2021

(30) Foreign Application Priority Data
Nov. 9, 2018 (DE) .......................... 102018219190.5

(51) Int. Cl.
*B23K 26/36* (2014.01)
*B23K 26/06* (2014.01)
(Continued)

(52) U.S. Cl.
CPC ........ *B23K 26/361* (2015.10); *B23K 26/0608* (2013.01); *B23K 26/0622* (2015.10);
(Continued)

(58) Field of Classification Search
None
See application file for complete search history.

(56) References Cited

U.S. PATENT DOCUMENTS 6,072,631 A * 6/2000 Guenther ............... G02B 27/09
359/569
2005/0230369 A1 10/2005 Cheng et al.
(Continued)

FOREIGN PATENT DOCUMENTS

CN 103889642 A 6/2014
CN 104884180 A 9/2015
(Continued)

OTHER PUBLICATIONS

Machine translation of WO 2016/012204 A1, published Jan. 2024.*
(Continued)

*Primary Examiner* — Geoffrey S Evans
(74) *Attorney, Agent, or Firm* — RMCK Law Group PLC

(57) ABSTRACT

An apparatus for structuring a roller surface is proposed, wherein the apparatus has a laser source and an optical system, wherein the laser source is designed for generating laser pulses, wherein the optical system has at least one beam shaper, at least one beam splitter, and a focusing unit, wherein the combination of beam shaper and beam splitter is arranged between the laser source and the focusing unit.

14 Claims, 2 Drawing Sheets

(51) Int. Cl.
  *B23K 26/0622* (2014.01)
  *B23K 26/067* (2006.01)
  *B23K 26/08* (2014.01)
  *B23K 26/082* (2014.01)
  *B23K 26/361* (2014.01)
  *G02B 27/09* (2006.01)
  *G02B 27/10* (2006.01)

(52) U.S. Cl.
  CPC ...... *B23K 26/0648* (2013.01); *B23K 26/0673* (2013.01); *B23K 26/082* (2015.10); *B23K 26/0823* (2013.01); *G02B 27/0944* (2013.01); *G02B 27/1093* (2013.01)

(56) References Cited

U.S. PATENT DOCUMENTS

| | | | |
|---|---|---|---|
| 2011/0165430 A1 | 7/2011 | Hesse et al. | |
| 2014/0217058 A1 | 8/2014 | Boegli et al. | |
| 2015/0209848 A1 | 7/2015 | Kopplin et al. | |
| 2015/0293371 A1* | 10/2015 | Song | G02B 27/4233 118/35 |
| 2019/0009370 A1 | 1/2019 | Matthews et al. | |
| 2020/0070280 A1* | 3/2020 | Gauch | B23K 26/0673 |
| 2021/0237199 A1* | 8/2021 | Boegli | G01J 1/0414 |

FOREIGN PATENT DOCUMENTS

| | | | | |
|---|---|---|---|---|
| CN | 106660088 A | 5/2017 | | |
| CN | 108495732 A | 9/2018 | | |
| DE | 60025877 | 9/2006 | | |
| DE | 102005017014 A1 * | 10/2006 | ......... | G02B 27/0905 |
| DE | 202012012732 U1 | 10/2013 | | |
| DE | 102012017703 A1 | 3/2014 | | |
| DE | 102014110285 A1 | 1/2016 | | |
| DE | 102014110285 A9 | 3/2016 | | |
| EP | 2006037 A1 | 12/2008 | | |
| EP | 2768626 A1 | 8/2014 | | |
| WO | WO-2016012204 A1 * | 1/2016 | ........... | B21B 27/005 |
| WO | 2018162356 A1 | 9/2018 | | |

OTHER PUBLICATIONS

Machine translation of DE-102005017014-A1, Sep. 2024 (Year: 2024).*
Search Report of Chinese Office Action for CN Application No. 2019800736815 mailed Jun. 29, 2022.
German Office Action for DE Application No. 10 2018 219 190.5 mailed Apr. 6, 2023.
International Search Report and Written Opinion for International Application No. PCT/EP2019/079458 mailed Feb. 3, 2020 with English language translation.
Jesacher, A., Booth, Martin J., "Parallel direct laser writing in three dimensions with spatially dependent aberration correction" Optics Express (2010).
Kuang, Z., et al. "Ultrafast laser parallel microprocessing using high uniformity binary Dammann grating generated beam array", Applied Surface Science (2013).

* cited by examiner

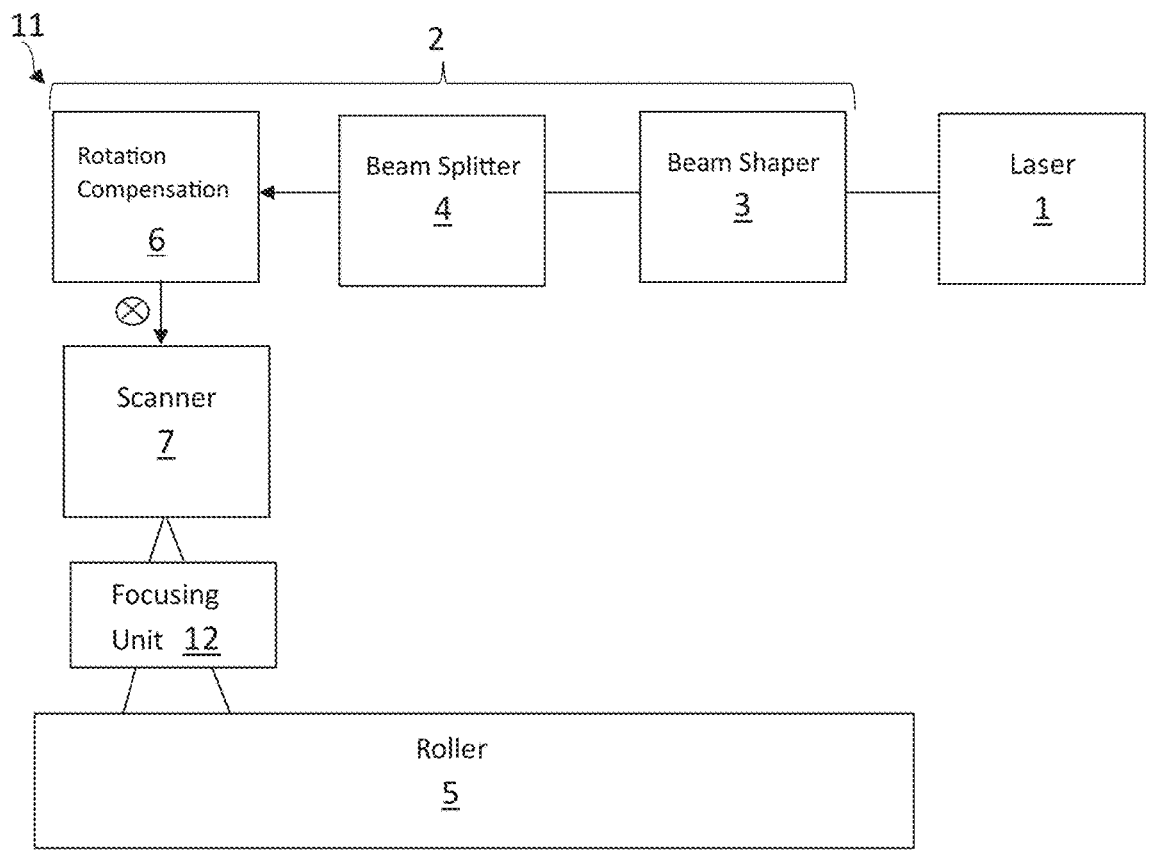
Fig. 1
Fig. 2
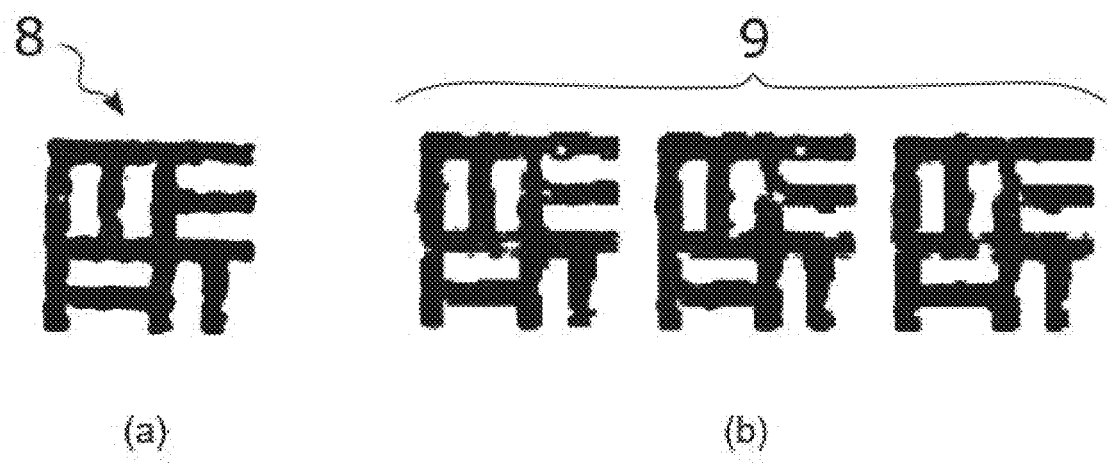
(a)            (b)

APPARATUS AND METHOD FOR STRUCTURING A ROLLER SURFACE

CROSS-REFERENCE TO RELATED APPLICATIONS

This application is a 371 U.S. National Stage of International Application No. PCT/EP2019/079458, filed Oct. 29, 2019, which claims the benefit of German Patent Application No. 10 2018 219 190.5 filed Nov. 9, 2018.

PRIOR ART

The present invention relates to an apparatus and to a method for structuring a roller surface, in particular of a skin pass roller, wherein the structuring is carried out by laser ablation.

An apparatus and a method of this type are known, for example, from the document DE 10 2014 110 285 A1. In the method proposed therein, such a roller surface is processed by a sequence of laser pulses, the spatial intensity distribution of which is modified by a beam shaper in a manner such that the processing field irradiated on the roller surface is changed and, in particular, enlarged.

The problem with such a method is that the modification of the spatial intensity distribution becomes increasingly complex when the irradiated processing field is enlarged. In the case of complex beam shaping, the greater the illumination is, the lower is also the efficiency of the beam-shaping optical elements. It is therefore technically desirable to bring about an enlargement of the irradiated surface area without being restricted by the intrinsic limits of beam shaping.

DISCLOSURE OF THE INVENTION

The present invention is based on the object of providing an apparatus and a method with which an enlargement of the surface area irradiated by the laser beam can be achieved.

This object is achieved by an apparatus for structuring a roller surface, wherein the apparatus has a laser source and an optical system, wherein the laser source is designed for generating laser pulses, wherein the optical system has at least one beam shaper, at least one beam splitter, and a focusing unit, wherein the combination of beam shaper and beam splitter is arranged between the laser source and the focusing unit.

In the apparatus according to the invention, the pulses generated by the laser source are manipulated in their intensity distribution through the interaction of at least one beam shaper and at least one beam splitter, wherein the arrangement/order of the beam shaper and beam splitter in the beam path can be arbitrary, meaning that first the beam shaper and then the beam splitter or first the beam splitter and then the beam shaper is irradiated, which cause a change in the phase space and are transferred by the focusing unit into the position space (mapping) before they are incident on the roller surface and, there, bring about structuring of the irradiated region by laser ablation. In a simple embodiment, the focusing unit is embodied in the form of an optical converging lens. In one embodiment, the latter is preferably an f-theta lens, which consists of one or more lens elements. f-theta lenses are state of the art. It is also conceivable to provide an optical element that combines the at least one beam shaper and the at least one beam splitter or in which the beam shaper and beam splitter are integrated. The device can, for example, have a receiving apparatus into which the roller to be structured is placed. The laser beam is then directed through the optical system onto a processing point or a processing surface area of the roller surface. In order to achieve a substantially complete structuring of the entire roller surface, this processing point or the processing surface area, or the roller surface, must be changed during processing, with the result that substantially the entire roller is scanned and the individual regions ablated by laser pulses form structuring on the roller surface that covers the surface area. This movement can be generated, for example, by an optical deflection unit and rotation of the roller, wherein the deflection unit, for example in the form of a rotatable mirror, scans the laser beam in the axial direction (in relation to the roller), while the rotation of the roller causes scanning in the azimuthal direction. For further details regarding the technical implementation, reference is made here to the above-mentioned document DE 10 2014 110 285 A1.

For effective processing, an optimum input of energy into the surface is desirable. The energy input per unit area (fluence in $J/cm^2$) directly determines the amount of ablated material, but the rate of ablation in relation to the power used (in $mm^3/(min*W)$) in this case usually has a maximum in a specific fluence range. For higher powers, the efficiency of the ablation process decreases, with the result that a disproportionately large increase in power is required for each further increase in the ablation rate. The point of maximum efficiency is also referred to below as optimum fluence or optimum energy input. The apparatus according to the invention makes it possible to manipulate the beam in such a way that the intensity of the laser pulses is distributed over the roller surface in such a way that the largest possible surface area is irradiated at the same time and, in addition, the optimum energy input is realized, if possible, in the points to be ablated. For this purpose, the laser beam is first modified by the at least one beam shaper in such a way that the energy input is concentrated in specific regions in a surface area that is irradiated with it, with the result that a correspondingly large amount of material is ablated at these locations. The intensity in the other regions of the irradiated surface area decreases accordingly, with the result that only a small amount of or no material is ablated there. In this way, a redistribution by means of spatial phase modulation or concentration of the radiation energy is achieved by the beam shaper alone and the surface area effective for the ablation is enlarged. The beam shaper represents an optical element and can be formed, for example, by a diffractive optical element (DOE) or a spatial light modulator (SLM). In order to further enlarge the irradiated surface area, at least one beam splitter is furthermore provided in the apparatus according to the invention in the beam path between the laser source and the focusing unit. In this way, for example, the laser beam modified by the beam shaper can be multiplied in an advantageously simple manner. The spatial intensity distribution of the pulse modulated by the beam shaper forms an elementary unit here that is multiplied by the beam splitter and thus irradiates a correspondingly larger region on the roller. The at least one beam shaper and the at least one beam splitter should preferably be selected or set here in such a way that the optimum fluence is achieved, if possible, in those regions of the irradiated surface area in which the radiant power is concentrated. The different ablation causes a relief-like modulation of the surface to form, wherein the exact shape of this modulation is determined by the interaction of the laser beam generated, the beam shaper, the beam splitter, and the roller material and can be set in an almost arbitrary manner.

Advantageous configurations and developments of the invention can be found in the dependent claims and also in the description with reference to the drawings.

According to a preferred embodiment of the invention, the beam shaper is designed in such a way that a modulated laser beam is generated by modulating the spatial intensity profile of a laser beam. The beam shaper is preferably designed here as a diffractive optical element (DOE) or a spatial light modulator (SLM). A diffractive optical element is a microstructured glass carrier by way of which the wavefront undergoes a phase modulation due to diffraction at the microstructure, resulting in the desired spatial intensity distribution due to interference. A similar manipulation of the intensity distribution can be achieved with a spatial light modulator, but the modulation can in this case be controlled directly and in an almost arbitrary manner. For this purpose, the spatial light modulator can, for example, have a pixel matrix, the pixels of which can be controlled electronically or optically in such a way that the laser light passing through them is changed in the desired manner.

According to a further preferred embodiment of the invention, the beam splitter is designed in such a way that an intensity pattern is generated on the roller surface by splitting the spatially phase-modulated laser beam and then focusing it. The core idea of the invention consists in bringing about multiplication of the irradiated region on the roller surface by means of a beam splitter. For this purpose, the laser beam modulated by the beam shaper is divided into several partial beams by the beam splitter, which are incident on the roller surface at the same time and together form an intensity pattern on the irradiated surface area. The intensity pattern generated in this way advantageously covers a surface area having a greater extent than the surface area that is irradiated by an undivided modulated laser beam. The beam splitter is preferably designed here as a diffractive optical element (DOE) or a spatial light modulator (SLM).

According to a further preferred embodiment of the invention, the beam shaper and the beam splitter interact to generate a contiguous intensity pattern on the roller surface. By introducing the beam splitter into the beam path between the laser source and the focusing unit, an intensity pattern that is substantially formed by multiplication from the intensity profile of the modulated laser beam is generated on the roller surface. The beam splitter thus generates an arrangement of a plurality of modulated laser spots by replication on the roller surface from a modulated laser beam. The shape of the intensity pattern can be influenced in a simple manner by way of the selection and relative positioning or alignment of the beam shaper and the beam splitter. The laser spots preferably touch and lie against one another, resulting in a contiguous intensity pattern. It is also conceivable that such a contiguous pattern is generated by overlapping of the laser spots. Continuous and gapless structuring can advantageously be effected with such a contiguous intensity pattern by way of successive scanning of the roller surface.

According to a further preferred embodiment of the invention, the beam shaper and the beam splitter interact to generate a seamlessly tileable intensity pattern on the roller surface. With a seamlessly tileable intensity pattern, continuous and gapless structuring of the roller surface can advantageously be achieved by simply arranging the irradiated surface areas in succession without overlap. The ablation pattern generated by the intensity pattern forms here the repetition unit that can be continued by successive repositioning of the laser beam to form surface-area-filling structuring of the roller surface.

According to a further preferred embodiment of the invention, the intensity pattern has a first region and a second region, wherein the energy input into the roller surface in the first region is lower than in the second region and the first region is substantially surrounded or enclosed by the second region. This is also implementable with more than two regions of different energy input. Due to the different energy inputs, the ablation creates a local height profile, in which the locations of higher intensity create valleys and/or trenches in the surface, while the surface is only slightly ablated or substantially not ablated at all in the regions of low intensity. In the case of a region of low intensity that is surrounded or enclosed by a region of increased intensity, a local elevation or preferably a plurality of local elevations are thus obtained, as a result of which structuring of the surface of any desired complexity in principle can advantageously be achieved. It is also conceivable that regions of low and high intensity alternate so that a ripple profile is impressed onto the roller surface at this location.

According to a further preferred embodiment of the invention, the energy input into the roller surface in the first region is selected in such a way that no or only a small amount of material is ablated. The enlargement according to the invention of the surface area ablated at the same time is substantially achieved by a clever redistribution of the radiation intensity within the irradiated surface area. A maximum structure depth can be achieved by alternating in the irradiated surface area regions of heavy ablation with regions in which only a small amount of material is ablated. Preferably, no material at all is ablated in these regions. The small amount of ablation can be achieved in that the intensity pattern correspondingly has regions of an intensity that bring about no or only a small amount of material ablation. In this way, an increased structure depth of the processed surface area can advantageously be realized.

According to a further preferred embodiment of the invention, the energy input into the roller surface in the second region is selected in such a way that the ratio of the material ablation to the radiant power is maximized. Since the ablation rate related to the power that is introduced usually has a maximum that corresponds to a maximally efficient ablation, it is advantageous to design the intensity pattern by selecting or setting the beam shaper and the beam splitter such that the optimum fluence is achieved in the regions of high intensity. As a result, a maximally effective ablation of the roller material is advantageously achieved. In the intensity pattern, regions with optimum fluence preferably alternate with regions in which the intensity is as low as possible or is zero. In this way, an optimum redistribution of the radiation intensity and correspondingly optimum material processing can advantageously be achieved.

The technical object of the invention formulated in the introductory part of the invention is also achieved by a method for structuring a roller surface, wherein a laser beam generated by a laser source is directed onto the roller surface and brings about material ablation on the roller surface, wherein a modulation of a spatial intensity profile is imparted in a first step to the laser beam generated by the laser source, wherein the modulated laser beam is divided into at least two partial beams in a second step in such a way that the at least two partial beams form an intensity pattern on the roller surface. As a result of the successive manipulation steps of beam shaping and beam splitting, the surface area processed with the laser pulse is advantageously enlarged without the enlargement having to be accomplished by a beam-transforming element alone. In this way, particularly efficient and time-saving processing of a roller surface can be realized.

According to a further preferred embodiment of the method according to the invention, the modulation of the spatial intensity profile and the division into at least two partial beams is effected in such a way that the intensity pattern on the roller surface has a first region and a second region, wherein an energy input into the roller surface in the first region is lower than in the second region and the first region is substantially surrounded or enclosed by the second region. This is also implementable with more than two regions of different energy input. The enlargement according to the invention of the surface area that is simultaneously processed by a laser pulse is substantially achieved by a clever distribution of the local energy input. The fact that, in the irradiated surface area, regions of heavy ablation alternate with regions in which only a small amount of material is ablated, advantageously brings about a maximum structure depth of the processed roller surface.

According to a further preferred embodiment of the method according to the invention, the energy input into the roller surface in the second region is selected in such a way that the ratio of the material ablation to the radiant power is maximized. The radiant power at which the material ablation is maximized for the respective power represents the optimum, i.e. the maximally efficient, operating point of the structuring method. Within the intensity pattern, regions of very low or negligible intensity preferably alternate with regions in which the energy introduced per unit area corresponds to the optimum fluence.

According to a further preferred embodiment of the method according to the invention, the roller surface is moved, in particular rotated, during the method. According to a further preferred embodiment of the method according to the invention, the at least two partial beams undergo, in a third step following the second step, a deflection, by means of which the roller surface is scanned in an axial direction. The movement of the roller is preferably combined with the deflection of the laser beam in a manner such that in this way the surface of the roller can be scanned with the laser beam in a precise manner.

Further details, features, and advantages of the invention are evident from the drawings and from the following description of a preferred embodiment with reference to the drawings. The drawings here illustrate merely an exemplary embodiment of the invention, which does not restrict the concept of the invention.

BRIEF DESCRIPTION OF THE DRAWINGS

FIG. 1 shows the schematic construction of an apparatus for structuring a roller surface according to an exemplary embodiment of the invention.

FIG. 2a schematically shows an intensity distribution of a modulated laser beam according to an exemplary embodiment of the invention.

FIG. 2b schematically shows an intensity pattern on the roller surface according to an exemplary embodiment of the invention.

EMBODIMENTS OF THE INVENTION

Figure 3:
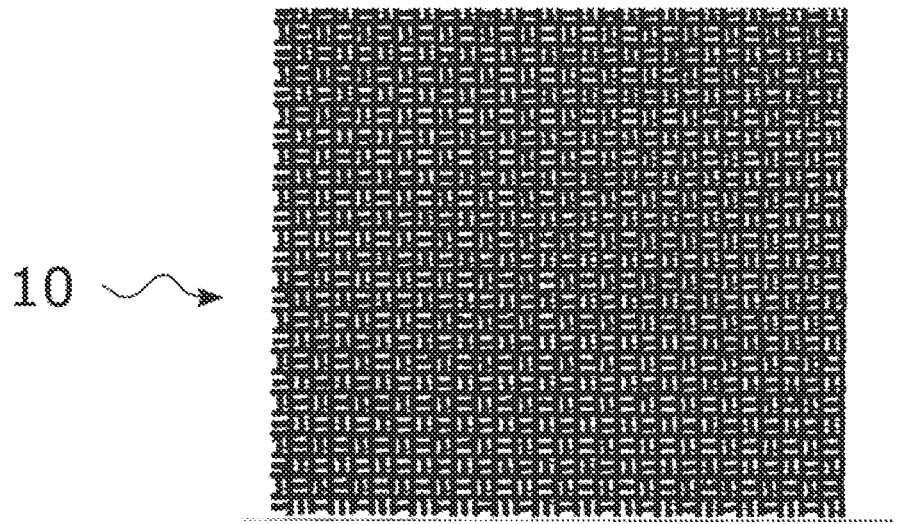
FIG. 3 shows structuring of the roller surface that can be generated by modulated laser beams.

In the various figures, the same parts are always provided with the same reference signs and will therefore generally also be named or mentioned only once in each case.

FIG. 1 schematically shows an apparatus 11 for structuring a roller surface according to an exemplary embodiment of the invention. The apparatus 11 comprises a laser source 1, which emits a pulsed laser beam that passes through an optical system 2 and causes material to be ablated from the surface of a rotating roller 5. The optical system 2 here has at least one beam shaper 3, at least one beam splitter 4, and a focusing unit 12, by which the laser beam is manipulated in such a way that the largest possible irradiated region is formed on the roller surface and the associated local energy input into the surface results in maximally efficient material ablation. For this purpose, the spatial intensity distribution of the laser beam is changed by the beam shaper 3 in such a way that the intensity is concentrated in specific regions, while regions in which the intensity is zero or almost zero are formed at the same time. This spatial redistribution of the radiation intensity leads to an enlargement of the spatial intensity profile, while the total radiant power remains the same. The laser beam modulated in this way is then divided into two or more partial beams by the beam splitter 4, wherein the beam shaper 3 and the beam splitter 4 bring about a change in the phase space, which is transferred by the focusing unit 12 into the position space (mapping), which are directed, through the rotation compensation 6 and the scanner 7, onto the roller 5, where they are simultaneously incident and form a common intensity pattern 9 on the surface. The intensity pattern 9 is advantageously such that an optimum energy input is generated in the regions of high concentration. This means that the local intensity is selected in such a way that a maximum material ablation for the respective input power is obtained. In contrast, a small amount of or preferably no material is ablated in the regions of low intensity, resulting in a height profile corresponding to the intensity pattern 9 on the surface due to the ablation. In addition to the combination according to the invention of beam shaper 3 and beam splitter 4, the embodiment shown also has rotation compensation 6 and a scanning unit 7. The two components 6 and 7, in interaction with the rotation of the roller 5, carry out the precise positioning of the laser pulses on the roller surface. The scanning unit 7 in this case scans the roller 5 in the axial direction, with the result that a structured line is created on the surface due to the close successive arrangement of the ablation locations. In order to compensate for the offset caused by the rotation of the roller 5, the rotation compensation 6 performs a deflection in the azimuthal direction (with respect to the roller), by means of which this offset is compensated such that a straight structured line in the axial direction is obtained. The functions of the two components 6 and 7 can preferably also be assumed by a common unit, which performs the deflection both in the axial direction and in the azimuthal direction. For further technical details of the laser source 1, the beam shaper 3, the rotation compensation 6, and the scanner 7, reference is made to the document DE 10 2014 110 285 A1, whose technical teaching on these points can be transferred analogously to the apparatus according to the invention.

An intensity distribution 8 of a modulated laser beam is shown schematically in FIG. 2a. The laser beam is modified by a beam shaper in such a way that its spatial intensity distribution corresponds to the pattern depicted. In the figure, the regions of high intensity are shown in black, while the regions of low or negligible intensity are shown in white. By means of the beam shaper 3, the intensity of the beam profile generated by the laser 1 is spatially redistributed in such a way that it is concentrated in the regions shown in black. If the pulse modified in this way is directly (i.e. without additionally passing through the beam splitter 4) incident on the roller surface, material is removed from the surface in the regions of high intensity, while the surface remains largely or entirely unchanged in the regions of low intensity.

An intensity pattern 9 as can be generated with the combination according to the invention of a beam shaper 3 and a beam splitter 4 is shown schematically in FIG. 2b. The arrangement/order in the beam path can be arbitrary. It is also possible to provide more than just one beam shaper and/or beam splitter (not shown here). The beam shaper and beam splitter can also be integrated in one optical element. The modulated intensity distribution from FIG. 2a, or the ablation profile caused thereby, forms here the unit cell of the structuring and is divided by the beam splitter 4 into three modulated laser spots, with the result that an intensity pattern 9 results from three unit cells and in this way advantageously the irradiated surface area is tripled without any additional modulation of the intensity having to be carried out. In FIG. 2b, the three unit cells are at a spatial distance from one another that can be changed arbitrarily, however, by setting the beam shaper 3 and beam splitter 4 accordingly, with the result that the unit cells can touch one another or even overlap. The intensity pattern 9 formed by the three unit cells causes material to be ablated from the roller surface at the locations of high intensity. According to the invention, the maximum intensity is preferably set up in such a way that optimum fluence and thus a maximally effective ablation are obtained. The laser beam that generates the intensity pattern 9 can now be guided over the roller surface, for example by way of rotating the roller and the deflection units 6 and 7, with the result that an ablation profile corresponding to the intensity pattern 9 is obtained at the irradiated locations and in this way substantially the entire roller surface can be structured.

FIG. 3 schematically shows a structuring 10, which is obtained by repeating the unit cell of FIG. 2a. Structuring is generated by the intensity distribution 8 of the modulated laser beam at each processing point or on each processing surface area on the roller surface, such that a piece of surface area of the extent of a unit cell can be processed in each processing step (i.e. at each positioning of the laser spot on the surface). The illustrated, surface-area-filling structuring 10 is obtained by scanning the roller surface.

Figure 4:
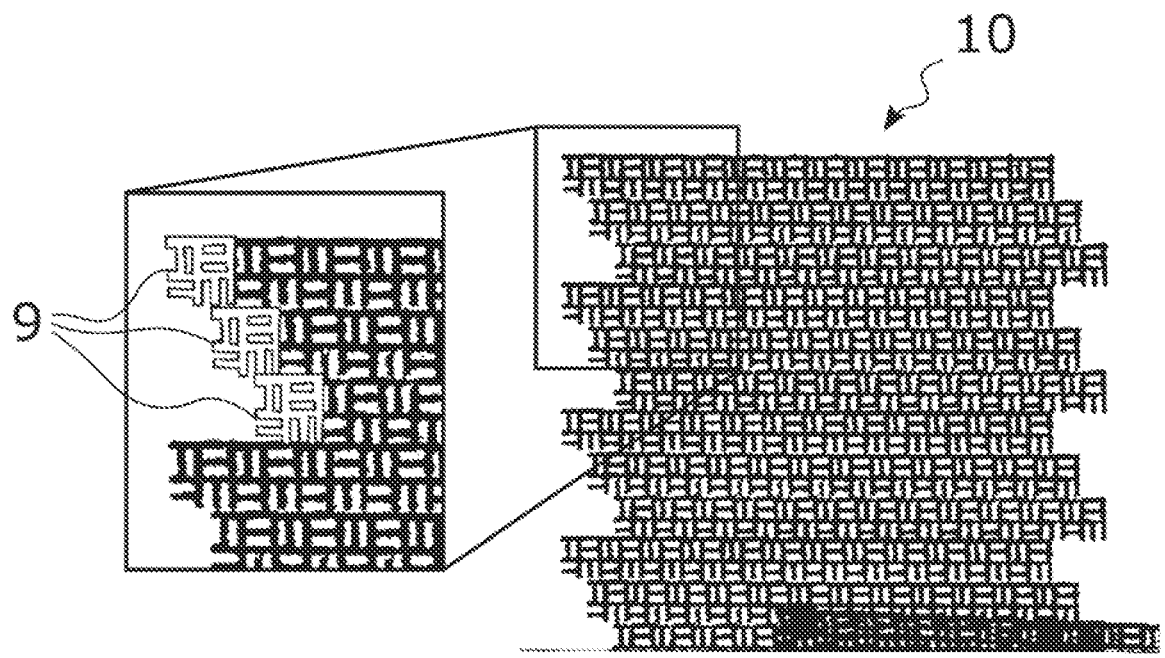
FIG. 4 schematically shows possible structuring of the roller surface by means of the combination according to the invention of a beam shaper and a beam splitter.

FIG. 4 schematically shows a structuring 10, which is obtained by repeating the three unit cells of FIG. 2b. The upper left part of the structuring 10 is shown enlarged and the intensity pattern 9, which is made up of three unit cells and is generated by the beam shaper 3 and the beam splitter 4, is marked for improved clarity. In comparison to FIG. 2b, the beam shaper 3 and the beam splitter 4 interact here in such a way that the three unit cells touch one another. This can be achieved, for example, by simply rotating the beam splitter 4 with respect to the beam shaper 3, with the result that the three unit cells in FIG. 2b each tilt individually and touch one another in the manner shown in FIG. 4. The intensity pattern 9 is tileable here in particular seamlessly, i.e. substantially the entire surface of the roller 5 can be structured without any gaps by simply repeating the pattern 9. By tripling the unit cell, a three times larger processing surface area is created, with the result that the time required for structuring is advantageously correspondingly shortened.

LIST OF REFERENCE SIGNS

1 Laser source
2 Optical system
3 Beam shaper
4 Beam splitter
5 Roller
6 Rotation compensation
7 Scanner
8 Intensity distribution of the modulated laser beam
9 Intensity pattern on the roller surface
10 Structuring of the roller surface
11 Apparatus for structuring a roller surface
12 Focusing unit

The invention claimed is:

1. An apparatus for structuring a roller surface, wherein the apparatus has a laser source and an optical system wherein the laser source is configured for generating laser pulses, wherein the optical system has at least one beam shaper, at least one beam splitter, and a focusing unit, wherein the combination of the at least one beam shaper and at least one beam splitter is arranged between the laser source and the focusing unit, wherein the order in the beam path is that first the beam shaper and then the beam splitter is irradiated, wherein the at least one beam shaper and the at least one beam splitter bring about a change in phase space, which is transferred into position space by the focusing unit.

2. The apparatus as claimed in claim 1, wherein the at least one beam shaper is for generating a spatially phase-modulated laser beam.

3. The apparatus as claimed in claim 2, wherein the at least one beam splitter is for creating an intensity pattern is generated on the roller surface by splitting the phase-modulated laser beam and then focusing it.

4. The apparatus as claimed in claim 2, wherein the at least one beam shaper and the at least one beam splitter interact to generate a contiguous intensity pattern on the roller surface.

5. The apparatus as claimed in claim 2, wherein the at least one beam shaper and the at least one beam splitter interact to generate a seamlessly tileable intensity pattern on the roller surface.

6. The apparatus as claimed in claim 2, wherein the intensity pattern has a first region and a second region, wherein an energy input into the roller surface in the first region is lower than in the second region and the first region is substantially surrounded or enclosed by the second region.

7. The apparatus as claimed in claim 6, wherein the energy input into the roller surface in the first region is selected such that no or only a small amount of material is ablated.

8. The apparatus as claimed in claim 7, wherein the energy input into the roller surface in the second region is selected such that the ratio of the material ablation to the radiant power is maximized.

9. A method for structuring a roller surface, wherein a laser pulse generated by a laser source is directed onto the roller surface and brings about material ablation on the roller surface, wherein a modulation of a spatial intensity profile is imparted in a first step to the laser pulse generated by the laser source by a beam shaper, wherein the modulated laser beam is divided into at least two partial beams by a beam splitter in a second step, subsequent to the first step, in such a way that the at least two partial beams form an intensity pattern on the roller surface, wherein the beam shaper and the beam splitter bring about a change in phase space, which is transferred into position space by a focusing unit.

10. The method as claimed in claim 9, wherein the modulation of the spatial intensity profile and the division into at least two partial beams is effected in such a way that the intensity pattern on the roller surface has a first region and a second region, wherein an energy input into the roller surface in the first region is lower than in the second region and the first region is substantially surrounded or enclosed by the second region.

11. The method as claimed in claim 10, wherein the energy input into the roller surface in the second region is selected such that the ratio of the material ablation to the radiant power is maximized.

12. The method as claimed in claim 11, wherein the roller surface is rotated, during the method.

13. The method as claimed in claim 12, wherein, in a third step following the second step, the at least two partial beams undergo a deflection, such that the roller surface is scanned in an axial direction.

14. The method of claim 9 wherein the beam shaper and the beam splitter are irradiated which cause the change in phase space.

* * * * *